Patented July 18, 1950

2,515,581

UNITED STATES PATENT OFFICE 2,515,581

REGENERATION OF ION EXCHANGE MATERIALS

Andrew J. Appelquest, Old Greenwich, Conn., assignor to American Cyanamid Company, New York, N. Y., a corporation of Maine No Drawing. Application August 7, 1947, Serial No. 767,333

5 Claims. (Cl. 260—96)

This invention relates to the activation of ion exchange materials and more particularly, to the activation of anion and cation exchange materials in the presence of each other.

Ion exchange as a method by which ionizable solids may be removed from liquid media is known. Among the first developments in the field was the use of a single bed of a cation active zeolite to soften water by replacing the metallic ions lending hardness thereto with sodium ions. It was later found expedient to use two beds of ion active material in series, one cation active and one anion active, and thus remove both cations and anions from liquid media. A most effective and efficient demineralization process has as one of its important features the use of a plurality of pairs of cation and anion exchangers.

The use of a single bed of mixed cation and anion exchange materials in place of separate alternate beds thereof has also been described. Many advantages may be attained by the use of mixed cation and anion exchange materials. In the first place, such a mixture often gives more efficient and more complete demineralization. Secondly, it permits the use of conventional types of equipment for liquid demineralization since it does not require any special equipment. As a result, mixed resins are useful in commercial installations either in the form of beds or as filter coatings and either in batch processes or in continuous processes.

Development in the field of liquid treatment by ion exchange processes has proceeded along another line simultaneously with the increased use of mixed ion exchange materials. Since purification of water or, in general, removal of ionizable solids from liquid media by means of a multi-bed system involves the use of heavy equipment including metallic, porcelain, or wooden tanks of considerable size, and because of the heavy demand for a highly purified water of a quality comparable to distilled water in many places where stills are not available or where it would be difficult to transport the stills and equipment normally used in purifying water by means of ion exchange materials, a lightweight portable water purification unit has seemed desirable, particularly for use in connection with military operations. As a result, disposable, portable cartridges containing alternate beds of anion and cation exchange materials have been developed. The next step in the development was the packing of mixed ion exchange materials instead of alternate beds of such materials in disposable cartridges.

One outstanding disadvantage in the use of mixed resins whether they be part of a commercial installation or a portable, disposable cartridge of one sort or another lies in the excessive waste of material originally considered necessarily inherent in processes using mixtures. The resins had to be discarded after they once became exhausted, and in view of the relatively high cost of ion exchange resins this procedure was not practical. This disadvantage has been overcome in one direction by the development of various processes for separating one resin from another in admixture in order that each type resin might be separately regenerated and remixed for further use.

It is an object of the present invention to provide a method for regenerating anion and cation exchange materials in the presence of each other, thus avoiding the necessity for separation of one resin from the other and at the same time overcoming, in another direction, the disadvantages of the use of mixed resins discussed above.

This and other objects are attained by treating a combination of anion and cation exchange resins first with a material which activates one type resin and further exhausts, or leaves exhausted to the same degree, the other type resin. The so-treated combination of resins is then treated with a substance which has no effect upon the activated exchange resin but which forms a compound or a complex with the exhausting group of the first material, this compound or complex being more stable than that of the exhausted exchange resin and the exhausting group. Thus, the substance removes the exhausting group from the exhausted exchange resin, leaving it in activated form.

The invention will be described in greater detail in conjunction with the following specific examples which are merely illustrative, and it is not intended that the scope of the invention be limited to the details therein set forth.

Example 1

A bed of cation exchange resin prepared according to Example 5 of U. S. Patent No. 2,372,233 is activated with an aqueous sulfuric acid solution and rinsed with water until the effluent contains no free mineral acidity. Ammonia is passed through the bed of rinsed resin at the rate of 32 cc. per min. and an amount of ammonia equivalent to about 18.6 kilograins of calcium carbonate is taken up by the bed. Thus, the cation resin bed may be said to be exhausted to ammonium or on the ammonium cycle.

An amount of formaldehyde, in the form of a

10% solution, equivalent to twice the amount of ammonium ion held on the resin is then passed through the resin bed and all of the ammonium is thereby removed from the resin, thus leaving it in an activated form.

The so-activated resin is found to have a capacity for the removal of cations from solution of about 20.5 kilograins of $CaCO_3$ per cubic foot of resin.

*Example 2*

A bed of anion exchange resin "A" prepared as later described in detail is activated with an aqueous solution of sodium hydroxide. The resin is then exhausted with a 6% hydrochloric acid solution to the extent of about 33 kilograins of $CaCO_3$ per cubic foot of resin.

A 4% ammonia solution is passed through the bed at a rate of about 30 cc. per min. until the resin is activated to a capacity equivalent to about 15.9 kilograins of $CaCO_3$ per cubic foot of resin.

A 10% formaldehyde solution is passed through the activated anion resin without exhausting any appreciable amount of its capacity.

From the results of Examples 1 and 2 it may be concluded that an anion resin which is exhausted to acid may be activated with ammonia and not deactivated by subsequent treatment with formaldehyde. Moreover, a cation resin on the ammonium cycle may be activated by treatment with formaldehyde which apparently removes the ammonium ion with formation of hexamethylene tetramine.

*Example 3*

A cylindrical container about 16" long, about 3" in diameter, made of cardboard lined with metal foil and coated with asphaltum or other waterproofing material, and having a liquid inlet and outlet is packed with a mixture of cation exchange resin prepared according to Example 5 of U. S. Patent No. 2,372,233 and activated with sulfuric acid as in Example 1, and anion exchange resin "A" activated as described in Example 2 with an aqueous solution of sodium hydroxide.

Water containing ionizable solids is passed through the cartridge until the resins therein no longer demonstrate any substantial capacity for the removal of cations and anions therefrom.

An about 3.6% solution of ammonia is then run through the mixture of exhausted resins in the container or cartridge until the cation resin has taken up an amount of ammonium ion equivalent to about 6.9 kilograins of $CaCO_3$ per cubic foot of resin and the anion resin has a capacity of about 12.1 kilograins of $CaCO_3$ per cubic foot of resin.

A 10% formaldehyde solution is run through the mixture of ammonia-treated resins at a rate of about 100 cc. per minute, and the resin bed is then rinsed.

The so-activated mixed resins have a capacity for the removal of ions from solution.

It should be noted that the relatively low ammonium content of cation resin in this example is probably due to the fact that before treatment with ammonia, the cation resin was exhausted to sodium, calcium and other cations commonly found in water and was not on the hydrogen cycle. In such a case, complete conversion to the ammonium cycle by direct treatment with ammonia is difficult, if not impossible.

*Example 4*

A container or cartridge similar to that described in Example 3 and containing a mixture of exhausted cation and anion exchange resins of the types described in Example 3 is regenerated in the following manner:

A 4% solution of hydrochloric acid is passed through the resin mixture to put the cation exchange resin on the hydrogen cycle. As a result of this treatment, the resin has a capacity equivalent to 16.2 kilograins of $CaCO_3$ per cubic foot of resin.

A 3.3% solution of ammonia is then passed through the cartridge whereby the anion resin attains a capacity of about 43.2 kilograins of $CaCO_3$ per cubic foot of resin.

After passing a 10% formaldehyde solution through the bed to remove the ammonia held by the cation resin and rinsing, the regenerated resin mixture is found to have a capacity for the removal of ions from solution.

*Example 5*

A bed of anion exchange resin "A'" is activated with an aqueous solution of sodium hydroxide. The resin is then exhausted with a 6% hydrochloric acid solution to the extent of about 44.9 kilograins of $CaCO_3$ per cubic foot of resin.

A 20% aqueous solution of hexamethylene tetramine is passed through the bed and about 12.1 kilograins as $CaCO_3$ of hydrochloric acid per cubic foot of resin is displaced by the hexamethylene tetramine, thus activating the anion resin to the extent of the 12.1 kilograins.

*Example 6*

A bed of cation exchange resin prepared according to Example 5 of U. S. Patent No. 2,372,233 is activated with an aqueous sulfuric acid solution and rinsed with water until the effluent contains no free mineral acidity.

A 20% solution of hexamethylene tetramine is passed through the bed and only a negligible amount of the capacity of the cation resin is exhausted, i. e., in the neighborhood of about 2 kilograins. Thus, hexamethylene tetramine can be said not to destroy the activity of an activated cation exchange resin.

*Exchange 7*

A container similar to that described in Example 3 and containing a mixture of exhausted cation and anion exchange resins of the types described in Example 3 is regenerated by treating the mixture first with a sulfuric acid solution to activate the cation exchange resin and further exhaust the anion exchange resin and then with a 20% aqueous solution of hexamethylene tetramine to activate the anion exchange resin.

The so-activated mixture of resins is found to have a capacity for the removal of anions and cations from solution.

*Preparation of resin "A"*

| | Parts |
|---|---|
| Tetraethylenepentamine (1.1 mols) | 203 |
| Epichlorohydrin (3.2 mols) | 297 |
| Water | 500 |

The tetraethylenepentamine is charged into a suitable reaction vessel with agitator and means for cooling the vessel. Water is added to the tetraethylenepentamine, the resulting solution is cooled to about 44°–47° C., and the epichlorohydrin is added slowly while the reacting mixture is continuously agitated and kept between 44°–47° C. After all the epichlorohydrin has been added, the resulting syrup is maintained at about 50° C. for about 8 hours. The gelled syrup is then heated or cured at 95°–105° C. for 17–18 hours. The cured resin is ground and screened and the 20–40 mesh material set aside for use in the resinous mixtures of the present invention.

Other combinations of activating reagents may be substituted for the ammonia and the formaldehyde of Examples 1–4, inclusive. For example, organic bases which will react with formaldehyde may be substituted for the ammonia. Such bases include guanidine, isothiourea, etc. Similarly, the hexamethylene tetramine of Examples 5–7, inclusive, may be replaced by amino compounds such as urea, etc.

If the cation resin in the mixture is on the hydrogen cycle it may readily be put on the ammonium cycle by treatment with ammonia. If, however, the resin has been exhausted and is on a sodium or similar cycle after a demineralization process, simple treatment with ammonia will not convert the resin to the ammonium cycle to any significant extent. In such a case it is desirable to first put the resin on the hydrogen cycle by treatment with an acid and then treat it with ammonia, or the exhausted resin may, if desired, be treated first with a salt such as ammonium chloride and then with the ammonia.

The present invention is concerned with the regeneration or activation of cation and anion exchange materials in the presence of each other. This includes both homogeneous and heterogeneous mixtures or, in general, any combination of the two types of resin in a single container. The principle of the invention could be applied just as well to the conventional multi-bed ion exchange systems but would be impractical since conventional activation of the cation and anion exchange resins with acid and alkali, respectively, is more efficient. It is thus immaterial to the process of the invention whether the resins are intimately and homogeneously mixed or whether they are placed in layers which latter case is intended to be included within the term "heterogeneous mixture" as used above.

Examples 1–4, inclusive, illustrate one general method of carrying out the present invention, namely, treatment first with a substance which will activate the anion exchange resin and exhaust the cation exchange resin to a cation which can be removed by subsequent treatment without interfering with the activity of the anion exchange resin. In a similar manner as illustrated by Examples 5–7, inclusive, the combination of resins may just as well be treated first with a material which activates the cation exchange resin, at the same time exhausting the anion exchange resin, and then with a substance which will not affect the activated cation resin but will remove the exhausting groups from the anion exchanger.

The present invention is in no sense limited to the particular anion and cation exchange resins of the specific examples. Other anion exchange resins to which it is equally applicable include: condensation products of acetaldehyde, formaldehyde and polyalkylene polyamines (copending application of Jack T. Thurston, Serial No. 643,836 filed January 26, 1946, now abandoned); condensation products of acrylonitrile-ammonocarbonic acid adducts and polyamines (copending application of James R. Dudley, Serial No. 651,375 filed March 1, 1946, now U. S. Patent No. 2,473,498); condensation products of aminotriazines, aldehydes, and guanido compounds (copending application of James R. Dudley, Serial No. 607,277 filed July 26, 1945, now abandoned), of aminotriazines, aldehydes, and strongly basic non-aromatic amines (copending application of James R. Dudley, Serial No. 649,127 filed February 20, 1946), and of biguanide, aldehydes and urea- or melamine-aldehyde condensation products as described in U. S. Patent No. 2,251,234; biguanide-carbonyl and aldehyde condensation products (copending application of Donald W. Kaiser, Serial No. 703,481 filed October 16, 1946); crotonaldehyde, formaldehyde and polyalkylene polyamine condensation products (copending application of James R. Dudley, Serial No. 643,838 filed January 26, 1946, now abandoned); polyepoxy and alkylene polyamine condensation products (copending application of James R. Dudley, Serial No. 655,005 filed March 16, 1946, now U. S. Patent No. 2,469,684); furfural and guanido-carbonyl condensation products (copending application of James R. Dudley, Serial No. 703,489 filed October 16, 1946); furyl aliphatic amine and aldehyde condensation products (copending application of James R. Dudley, Serial No. 642,416 filed January 19, 1946); glycerol dichlorhydrin and alkylene polyamine condensation products (copending application of Lennart A. Lundberg, Serial No. 624,606 filed October 25, 1945, now U. S. Patent No. 2,469,693); guanido-aldehyde, urea, etc. and aldehyde condensation products (copending application of James R. Dudley and Wilbur N. Oldham, Serial No. 703,488 filed October 16, 1946); a guanido-ketone, urea, etc. and aldehyde condensation products (copending application of James R. Dudley, Serial No. 703,487 filed October 16, 1946); guanyl urea, aldehyde, urea, etc. and aldehyde condensation products (copending application of Robert C. Swain, Serial No. 368,105 filed November 30, 1940, now abandoned); phenyl biguanide, aldehyde, urea, etc. and aldehyde condensation products (copending application of Robert C. Swain, Serial No. 443,939 filed May 21, 1942, now abandoned); polyacrylic acid and polyamine condensation products (copending application of James R. Dudley, Serial No. 648,818 filed February 19, 1946); polyamine-aldehyde and urea-formaldehyde condensation products (copending application of James R. Dudley, Serial No. 442,281 filed May 8, 1942, now abandoned); polyamine-aldehyde and amino-triazine-formaldehyde condensation products (copending applications of James R. Dudley, Serial Nos. 442,282 filed May 8, 1942, now abandoned, and 633,859 filed December 8, 1945); bifunctional triazines and polyalkylene polyamine condensation products (copending application of James R. Dudley, Serial No. 638,462 filed December 29, 1945, now U. S. Patent No. 2,467,523); and phenol, formaldehyde and tetraethylenepentamine condensation products as described in U. S. Patents Nos. 2,402,384 and 2,341,907.

Similarly, the following cation exchange resins may be regenerated in the manner of the present invention: bisphenol, sulfite and formaldehyde condensation products (copending application of Harold M. Day and Donald L. DeHoff, Serial No. 676,096 filed June 11, 1946); furfural and mineral acid halide condensation products as described in U. S. Patent No. 2,408,615; sulfonated or phosphonated resinified furfural (copending application of Jack T. Thurston, Serial No. 652,235 filed March 5, 1946); bisphenol sulfone, sulfite and formaldehyde condensation products (copending application of Harold M. Day, Serial No. 694,817 filed September 4, 1946, now U. S. Patent No. 2,497,054); aldehyde condensation products of sulfonated hydroxy-aromatic compounds containing a ketone group (copending application of Jack T. Thurston, Serial No. 541,480 filed June 21, 1944, now U. S. Patent No. 2,440,669); nuclearly sulfonated phenol-aldehyde condensation products as described in U. S. Patents Nos. 2,204,539, 2,230,641 and 2,361,754; omega-sulfonated phenol-formaldehyde condensation products as described in U. S. Patents Nos. 2,228,159 and 2,228,160; sulfonated coal and other carbonaceous materials as described in U. S. Patents Nos. 2,191,063, 2,205,635, 2,191,060 and 2,206,007; and polyhydric phenol-aldehyde condensation products as described in U. S. Patent No. 2,104,501.

It is an advantage of the present invention that anion and cation exchange resins can be regenerated without separation from each other in cases where it is advantageous practice to use them mixed. This is particularly important in the use of homogeneous mixtures or alternate layers of ion exchange resins in small portable water demineralization cartridges.

It is a further advantage of the present invention that anion and cation exchange materials need not be regenerated in separate containers and hence, if a combination of the two types of resin is contemplated the resins need not be separated, one type from the other, before regeneration. Thus, the process of the present invention makes possible the use of mixed resins in a single container over a number of complete ion exchange cycles without separation of the resins at any part of the cycle.

The present invention finds application wherever resins are to be used in combination including water treating plants for the production of high quality demineralized water, portable water-demineralizing cartridges, processes for the treatment of sugar-containing solutions, etc. In all applications of the present invention the possibility of using a single exchange container will simplify operation and reduce the cost of equipment.

I claim:
1. A process of activating anion and cation exchange resins in the presence of each other which comprises treating the combination of resins first with acid and then with a reagent selected from the group consisting of (1) hexamethylenetetramine and (2) ammonia followed by formaldehyde.

2. A process according to claim 1 in which the combination of resins is a homogeneous mixture.

3. A process according to claim 1 in which the resins are present in the combination in the form of alternate layers.

4. A process of activating anion and cation exchange resins in the presence of each other which comprises treating the combination of resins first with acid to put the cation exchange component thereof on the hydrogen cycle, then with ammonia to put the cation component thereof on the ammonium cycle and to activate the anion exchange component thereof, and finally with formaldehyde.

5. A process of activating anion and cation exchange resins in the presence of each other which comprises treating the combination of resins first with acid to activate the cation exchange resin, and then with hexamethylenetetramine.

ANDREN J. APPELQUEST.

REFERENCES CITED

The following references are of record in the file of this patent:

UNITED STATES PATENTS

| Number | Name | Date |
| --- | --- | --- |
| 2,275,210 | Urbain et al. | Mar. 3, 1942 |